J. Shappell,
Churn.
No. 110,296. Patented Dec. 20. 1870.
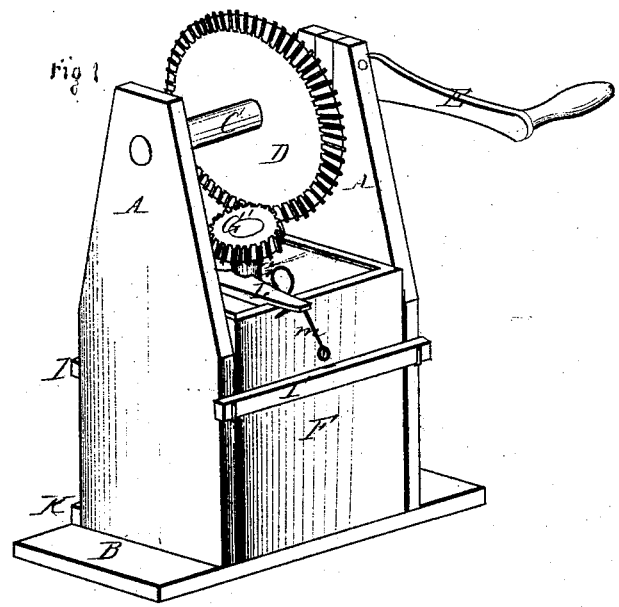
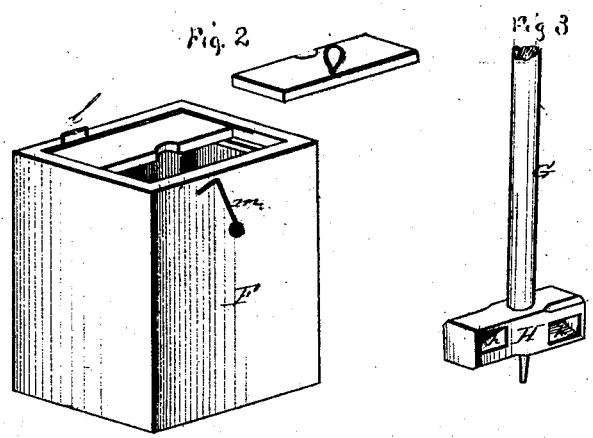
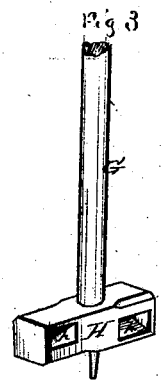
Witnesses
John Shappell
Inventor
by his Atty
Thomas A. Connolly

United States Patent Office.

JOHN SHAPPELL, OF LYNNVILLE, PENNSYLVANIA.

Letters Patent No. 110,296, dated December 20, 1870.

IMPROVEMENT IN CHURNS.

The Schedule referred to in these Letters Patent and making part of the same.

*To all whom it may concern:*

Be it known that I, JOHN SHAPPELL, of Lynnville, in the county of Lehigh and State of Pennsylvania, have invented certain Improvements in Churns, of which the following is a full, clear, and exact description, reference being had to the accompanying drawing forming part of this specification, in which—

Figure 1 is a perspective view of the churn complete.

Figure 2 is a perspective view of the box apart from frame.

Figure 3 is a perspective view of dash.

These improvements relate to the mode of securing a detachable box to the frame, to the form of the dash, and the device for preventing lateral motion of the dash-shaft.

In the accompanying drawing—

A A are the upright sides, and B the horizontal base constituting the frame.

C is a horizontal shaft, journaled in the upper part of the sides A A, and supporting a bevel gear-wheel, D.

E is a crank for turning the shaft.

F is a box, constructed of the proper size and shape to fit closely between the sides A A, and resting on the base B.

This box is provided with a double lid having a circular opening in the middle, through which passes the vertical dash-shaft G, upon the upper end of which is a beveled pinion, G', arranged to gear with the wheel D.

The dash H is attached to the lower end of the shaft G, which turns in a suitable bearing in the bottom of the box.

The dash H consists of a rectangular block, through which the openings $h\ h$ are cut at opposite inclines, in order to cause increased commotion of the cream, and, by breaking the globules, more speedily release the butter.

I' I are horizontal cross-bars extending across the front and back of the box F, their ends resting in staples, $i\ i$, inserted in the edges of the sides A A.

These, with the bottom cleat K, are designed to keep the box secure while the churn is in operation.

L is a bar extending across the top of the box F, one end being held by a staple, $l$, and the other, which is provided with an eye on its under side, by the hook $m$ attached to the front of the box.

For the support of the shaft G a semicircular recess is formed in the bar L, to correspond therewith.

To remove the butter, the box F is detached from the frame by removing the front bar I, and the dash and shaft taken out by displacing the bar L and uncovering the box.

Having fully described the same,

What I claim as my invention, and desire to secure by Letters Patent, is—

The arrangement of the frame A A B, removable box F, bars I I', gearing G' D, shaft C, bar L, shaft G, and dasher H, as and for the purpose set forth.

JOHN SHAPPELL.

Witnesses:
GEO. K. WILSON,
JOSHUA STAHLER.